(12) United States Patent
Wittig

(10) Patent No.: US 8,764,397 B1
(45) Date of Patent: Jul. 1, 2014

(54) METHOD AND SYSTEM FOR STALL-TOLERANT ROTOR

(76) Inventor: Michael Brian Wittig, Fremont, CA (US)

(*) Notice: Subject to any disclaimer, the term of this patent is extended or adjusted under 35 U.S.C. 154(b) by 716 days.

(21) Appl. No.: 11/654,323

(22) Filed: Jan. 16, 2007

(51) Int. Cl.
*B64C 11/34* (2006.01)

(52) U.S. Cl.
USPC ............ 416/128; 416/1; 416/146 R; 416/203; 416/198 R; 416/61; 416/33; 416/36

(58) Field of Classification Search
USPC ....... 416/128, 155, 159, 1, 33, 36, 61, 198 R, 416/111, 115, 201 R, 198 A, 203
See application file for complete search history.

(56) References Cited

U.S. PATENT DOCUMENTS

| | | | | |
|---|---|---|---|---|
| 2,487,020 | A * | 11/1949 | Gilcrease | 416/127 |
| 3,127,093 | A * | 3/1964 | Sudrow | 415/66 |
| 4,828,205 | A * | 5/1989 | Durand | 244/17.23 |
| 4,936,746 | A * | 6/1990 | Mayo et al. | 416/46 |
| 5,058,824 | A * | 10/1991 | Cycon et al. | 244/17.13 |
| 5,505,589 | A * | 4/1996 | Bergey | 416/147 |
| 6,543,726 | B2 * | 4/2003 | Illingworth | 244/204.1 |
| 6,886,777 | B2 * | 5/2005 | Rock | 244/17.23 |
| 7,604,198 | B2 * | 10/2009 | Petersen | 244/17.23 |

OTHER PUBLICATIONS

Lodge, Don, Radio Control Model Helicopter Handbook, 1983, pp. 72-81, Tab Books Inc., Blue Ridge Summit, PA.
Simons, Martin, Model Aircraft Aerodynamics; 1994, pp. 17-30; Argus Books, Hemel Hempstead, Herts HP2 7ST, England.
White, Frank M., Fluid Mechanics, 1986, pp. 423-431, McGraw-Hill, Inc., New York, NY.
Pilot'S Web Contributors, Pilot's Web The Aviators' Journal—More About Lift and Drag (retrieved Jan. 22, 2014, last updated May 17, 2005), retrieved from http://pilotsweb.com/principle/liftdrag.htm.
Wikipedia Contributors, Sikorsky S-69—Wikipedia, the free encyclopedia (retrieved Jan. 22, 2014), retrieved from http://en.wikipedia.org/wiki/Sikorsky_S-69.
Drela, Mark, Low-Reynolds-No. Airfoil Design for the M.I.T. Daedalus Prototype: A Case Study, Journal of Aircraft, vol. 25, No. 8, pp. 724-732, 1988.
Patterson, William B., Design Process of a Human Powered Helicopter, (retrieved Jan. 22, 2014), retrieved from http://www.humanpoweredhelicopters.org/davinci/da Vinci paper.pdf.

* cited by examiner

Primary Examiner — Ninh H Nguyen

(57) ABSTRACT

A rotor system is provided wherein coaxial, closely spaced multi-bladed rotors counter-rotate at extremely low RPMs while their pitches are controlled to account for wind gusts and velocity conditions, thereby eliminating many of the deficiencies of conventional helicopters. The embodiments can dramatically decrease the power required to lift a given quantity of weight, even beyond the level required by a typical airplane.

26 Claims, 17 Drawing Sheets

METHOD AND SYSTEM FOR STALL-TOLERANT ROTOR

BACKGROUND

These embodiments relate to devices employing rotors, such as helicopters and wind turbines.

Normally in an aircraft employing an airfoil to provide lift, it is desirable to prevent a stall from occurring. A stall generally occurs when the angle of attack of the airfoil exceeds the critical angle of attack at a particular speed. The critical angle attack is the point on the lift coefficient vs. angle of attack curve of the airfoil where maximum lift is achieved. After this point, increasing the angle of attack reduces the lift sharply, generally as a result of the air boundary layer separating from the surface of the airfoil. Stalls are often talked about in terms of airspeed, or the speed of the air flowing across the airfoil, however, because as airspeed decreases, the angle of attack required to produce a given amount of lift (i.e., the aircraft's weight) increases. The above description applies to both the wings of a fixed-wing aircraft such as a plane and to the blades of a rotary wing aircraft such as a helicopter, because both the plane's wings and the helicopters rotors use airfoils to generate lift. In the case of a typical helicopter employing a single main rotor, however, the left and right sides of the rotor during forward flight have different effective airspeeds. In a helicopter in which the rotor rotates counterclockwise when viewed from above, for example, the left tip of the rotor (the retreating blade) sees its tip airspeed minus the craft's forward speed, while the right tip of the rotor (the advancing blade) sees its tip airspeed plus the craft's forward speed. Therefore, when the craft's forward speed (or even the speed of a gust of wind, for that matter) is a significant fraction of the tip speed, a stall can occur on the retreating blade, resulting in a violent shift in the craft's attitude (generally a nose up due to gyroscopic precession and then a roll toward to the retreating side). Generally, only exceptional pilots at high altitudes can hope to recover from such an event. Therefore, helicopters have a V-ne (velocity never exceed) speed limit pilots are warned to obey at all times that is sufficiently low relative to the tip speed to prevent a retreating blade stall from occurring. To prevent the V-ne from being excessively low (rendering the helicopter too slow to perform usefully or incapable of flying in typical winds), the rotor tip speed is kept high, typically on the order of 450 mph. That way, a 100 mph forward speed or a 100 mph wind only changes the effective tip speed by less than 25%.

Having such a high tip speed creates other problems, however. The advancing blade of the rotor may approach supersonic speeds during high speed flight, causing shockwaves that disrupt airflow over the blades, destroying lift. Additionally, the high tip speed causes large centrifugal loads on the blades and rotor hubs that require additional material weight and aerodynamic drag to provide the requisite strength.

Pilots of conventional helicopters are in fact trained to maintain the RPM (revolutions per minute) of the rotor in a narrow range, preventing more than a few percent of variation through adjusting the pitch of the rotor blades or the power delivered from the helicopter's engines.

The high tip speed of a conventional design generally to avoid a stall also results in significantly lower power efficiencies in terms of the power required to lift a given amount of weight. For example, the lift a rotor produces is proportional to the square of its speed, but the power it consumes to do so is proportional to the cube of its speed. For example, increasing the speed of a rotor by a factor of 10 would increase lift by a factor of 100, but it would also simultaneously increase the power required by a factor of 1000!

The high tip speed also results in excessive noise, a great concern both to military aircraft for stealth reasons and to civilian aircraft flying close to populated areas.

The high tip speed can also result in injury or death to a person hit by the rotor.

The high tip speeds also may create a turbulent wake behind a whirling blade, which may reduce the efficiency of another blade of the same rotor following in the same path.

Finally, the high tip speed results in turbulent downdraft and vortices from the rotor that can endanger the helicopter during certain conditions, such as when the helicopter descends through its own downwash at a high rate.

Therefore, we can say that the danger of a stall is perceived as such a serious threat that many additional complications arise and performance sacrifices must be made through efforts to avoid it. It would be highly desirable to overcome these necessary evils.

It would also be advantageous to avoid the need for a tail rotor, as conventional helicopters using a single rotor driven by an engine in the airframe need to counterbalance the reaction force of turning the rotor. Estimates on the additional power consumed for the tail rotor to balance the torque from the main rotor range from 5-30%. Having to constantly balance the main rotor torque results in the need for almost constant pilot input to adjust for small wind shifts and changes in aerodynamic effects as the helicopter maneuvers, however, which we perceive as a much more serious consequence of having a tail rotor, making the aircraft much more difficult to control from the pilot's standpoint.

A few helicopters have used coaxial twin rotors to try to mitigate some of the aforementioned deficiencies. The coaxial configuration has two rotors along the same axis, rotating in opposite directions. However, up until this point, helicopters using such a configuration are otherwise exceedingly conventional, using 2-3 blades per rotor, high tip speeds, blade angles of attack tied together in some way, and so on. As a result, the coaxial configurations built to date have not shown advantages sufficient in the market to displace in any quantity the standard main rotor/tail rotor configuration used on nearly all (>95%) of helicopters.

SUMMARY

A rotor system is provided wherein coaxial, closely spaced multi-bladed rotors counter-rotate at extremely low RPMs while their pitches are controlled to account for wind gusts and velocity conditions, thereby eliminating many of the deficiencies of conventional helicopters. The embodiments can dramatically decrease the power required to lift a given quantity of weight, even beyond the level required by a typical airplane.

BRIEF DESCRIPTION OF THE DRAWINGS

The embodiments are further described by way of example with reference to the accompanying drawings wherein.

DETAILED DESCRIPTION

Figure 1:
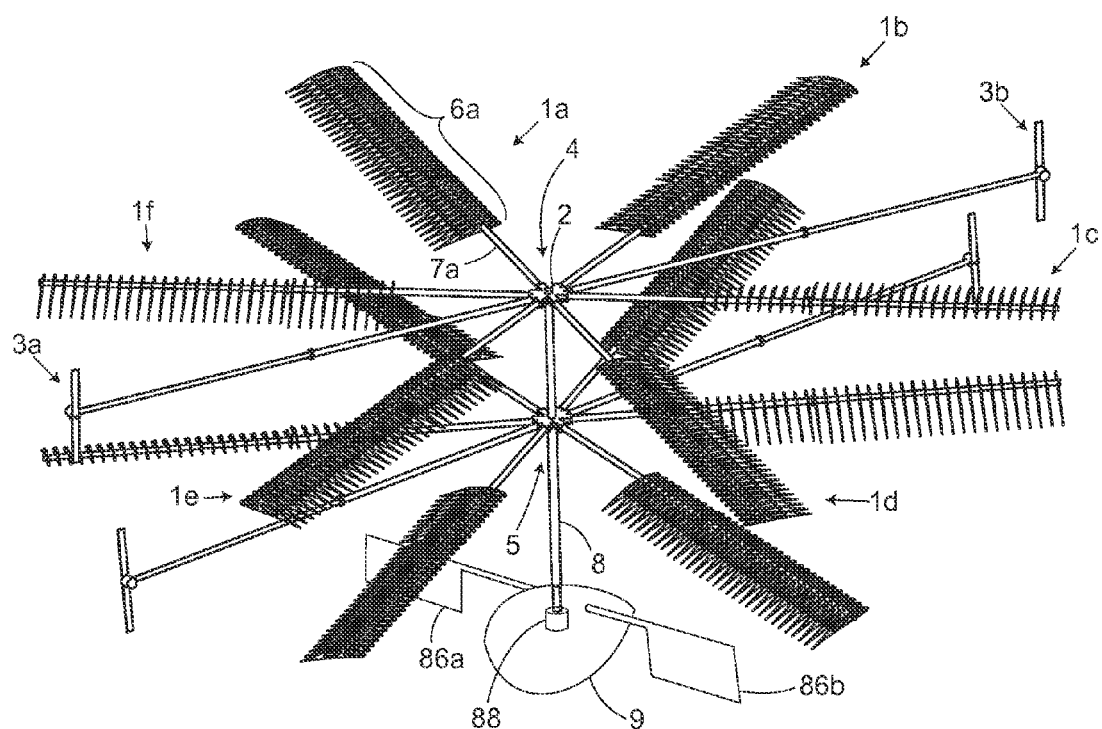
FIG. 1 is a simplified isometric view of the preferred embodiment.

FIG. 1 shows a first embodiment. Rotor systems 4 and 5 lift an airframe 9. Rotor system 4 is propelled not by power transmitted by a rotor shaft 8, but rather by motorized props 3a and 3b, each of which provide thrust to rotate the entire rotor system 4. Rotor system 5 works the same way but spins in the opposite direction on rotor shaft 8. This arrangement may seem peculiar at first, because neither rotor system produces any significant torque about rotor shaft 8 that would cause airframe 9 to rotate undesirably, (since there is no torque transmitted from airframe 9 up rotor shaft 8). It would therefore seem that having two rotors is redundant, as in a normal coaxial configuration the main advantage of having two rotors spinning in opposite directions is to cancel each other's torques and eliminate the need for a tail rotor. The reasoning for having two torque-less rotors will be clarified later on in this description.

Rotor system 4 is comprised of blades 1a through 1f attached to a hub 2. Hub 2 is driven by motorized props 3a and 3b. Each of the motorized props consists of a propeller driven by an electric motor and mounted to a carbon fiber pole, which is attached to a hub 2. Rotor system 5 is built identically to rotor system 4 with the exception that its blades and motorized props are reversed to allow for rotation in the opposite direction of rotor system 4. As shown in FIG. 1, rotor system 4 spins clockwise and rotor system 5 spins counterclockwise. Blade 1a is further comprised of ribs 6a, which are glued to a carbon fiber spar 7a. Ribs 6a are covered by a lightweight film covering material (not shown) such as that used on model aircraft (such a material is preferred for ease of application) or alternatively mylar. Normally carbon fiber spar 7a is circular, because that is what is available from stock and therefore is preferred, but alternatively carbon fiber spar 7a can be made with a slightly elliptical shape (or other non-circular shape such as a square or I-beam), so that rotating carbon fiber spar 7a can transmit a torque to ribs 6a on the basis of shape alone, without requiring glue. If carbon fiber spar 7a is made in an elliptical shape, it is preferable that its dimension along its major axis is less than 30% greater than its dimension along its minor axis. Because rotor system 4 is driven by motorized props 3a and 3b, and hub 2 is mounted via ball bearings to rotor shaft 8, there is no significant torque delivered to rotor shaft 8 (the friction from the bearings causes a torque, but this contribution is normally very small). Therefore, airframe 9 generally does not spin in reaction to rotor system 4 turning, or if it does have a slight spin it is easily corrected with, for example, vanes 86a and 86b. Since rotor system 5 is the same as rotor system 4 other than the reversal of the blades and props, rotor system 5 generally does not cause airframe 9 to spin either. Rotor systems 4 and 5 preferably turn at an RPM low enough to reduce their tip speed to less than 200 MPH. In the preferred embodiment shown in FIG. 1, the tip speed is typically less than 100 MPH, requiring a tip speed of only approximately 40 MPH to hover. The resulting Reynolds number is approximately 930,000. By comparison, a Bell UH-1F "Huey" helicopter operates at a Reynolds number of around 9,300,000, a factor of 10 difference.

Figure 2:
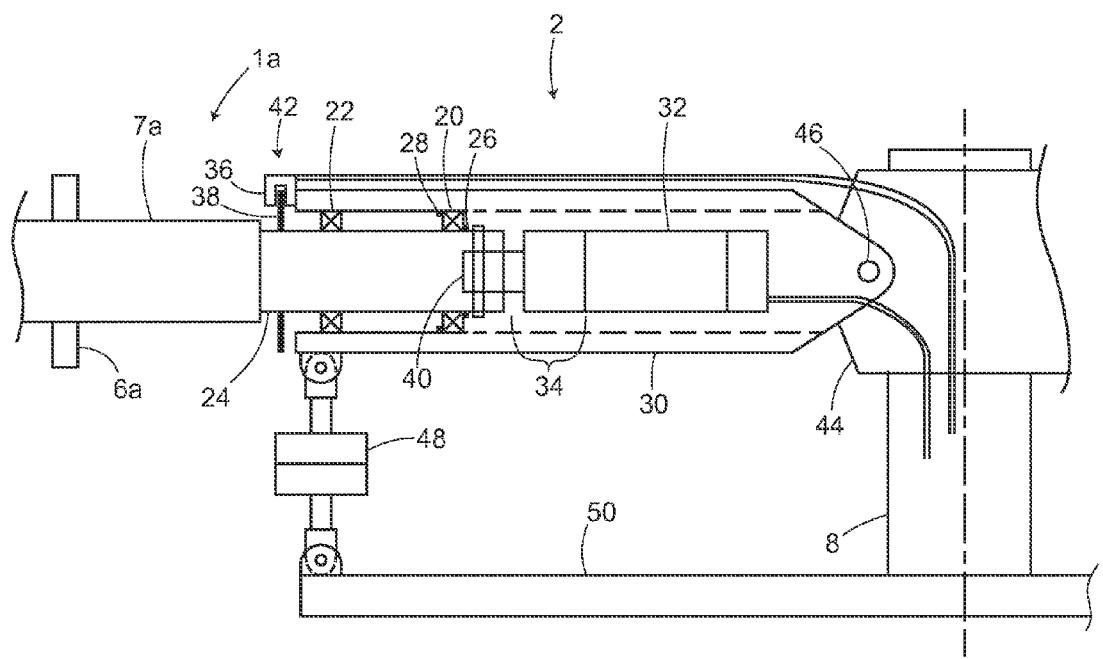
FIG. 2 is a simplified close-up elevation view of the embodiment shown in FIG. 1.

As shown in FIG. 2, blade 1a is attached to hub 2 through a shaft 24, which passes through an angular contact bearing 20 and a ball bearing 22. Shaft 24 has a flange 26 rigidly attached to it, which transmits centrifugal force to angular contact bearing 20, which transfers it to a flange 28 of a hub arm 30. Hub arm 30 has an electric motor 32 mounted in it. Electric motor 32 is attached to a transmission 34, which has a shaft 40 rigidly attached to shaft 24. Transmission 34 and electric motor 32 are fixed to hub arm 30, but shaft 40 rotates relative to them. Therefore, shaft 40 causes shaft 24 to rotate, which causes carbon fiber spar 7a to rotate, which in turn causes ribs 6a to change their angle of attack. An encoder wheel 38 is rigidly attached to shaft 24, so that encoder sensor 36 measures the angle of rotation of shaft 24, and therefore carbon fiber spar 7a and ribs 6a. Encoder wheel 38 and an encoder sensor 36 together comprise encoder or angular position sensor 42. Therefore, the angle of attack of blade 1a can be measured by encoder 42. Hub arm 30 is attached to a rotor shaft attach 44 via a pin 46, while rotor shaft attach 44 is fixed to rotor shaft 8. Therefore, any torque on hub arm 30 is measured as a force at a force sensor 48, which is connected via pin linkages between hub arm 30 and a force sensor support 50 (force sensor support 50 is rigidly attached to rotor shaft 8). For example, lift on blade 1a that would cause carbon fiber spar 7a to lift upwards would cause a clockwise torque on hub arm 30 about the axis of pin 46, which would in turn result in an extension force being measured at force sensor 48. Therefore, hub 2 allows the angle of attack and the lift force of blades 1a to be measured. Each blade 1a through 1f of rotor system 4 (and therefore rotor system 5 as well) has an identical arrangement, allowing the angle of attack and lift force of each blade to be accurately measured.

Figure 3:
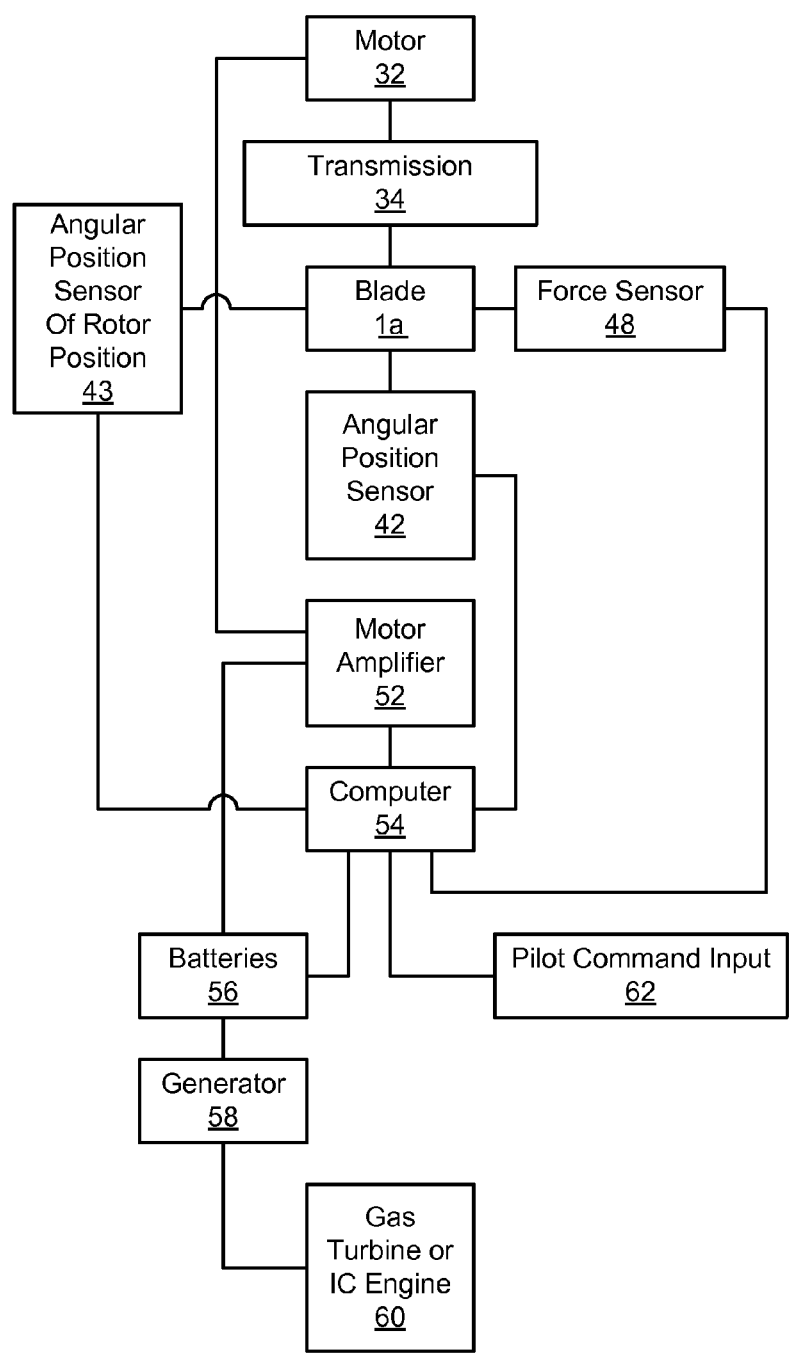
FIG. 3 is a simplified schematic diagram of the embodiment shown in FIG. 1.
Figure 12:
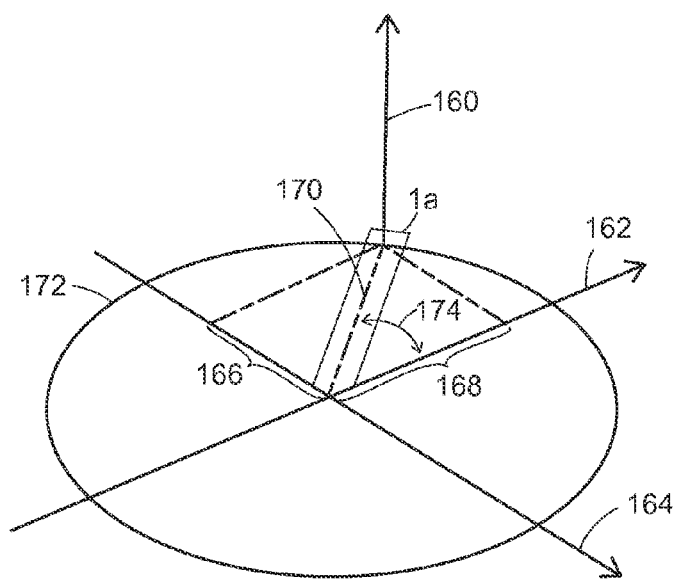
FIG. 12 is a simplified isometric diagram view of the present embodiments.

FIG. 3 shows a schematic diagram of how a computer is used to control each blade under a pilot command input 62. A computer 54 receives signals from force sensor 48 and angular position sensor 42. An angular position sensor 43 detects the angle of a rotor with respect to the airframe. Computer 54 uses a control system that tries to balance the torque on rotor shaft 8 to prevent rotor shaft 8 from pitching or rolling airframe 9 when the aircraft is hovering, for example. For both the pitch and roll axes (the two axes of a plane perpendicular to rotor shaft 8), the torque contribution of each blade of each rotor is accounted for and the angle of attack of each blade is adjusted continuously such that the sum of the torques contributed by all of the blades is zero. FIG. 12 shows how a lift force 160 acting on blade 1a at an effective radius 170 "r", comprising the torque on blade 1a as a result of lift, can be resolved into a torque about the pitch axis 164, which we can call "X", and a torque about the roll axis 162, which we can call "Y". Calling angle 174 "theta", and lift force 160 "F", we can write the equations for balancing the torque resulting for 6 blades as:

$$\mathrm{Sum}X = F_1 * r * \cos(\text{theta}_1) + F_2 * r * \cos(\text{theta}_2) + F_3 * r * \cos(\text{theta}_3) + F_4 * r * \cos(\text{theta}_4) + F_5 * r * \cos(\text{theta}_5) + F_6 * r * \cos(\text{theta}_6) = 0$$

$$\mathrm{Sum}Y = F_1 * r * \sin(\text{theta}_1) + F_2 * r * \sin(\text{theta}_2) + F_3 * r * \sin(\text{theta}_3) + F_4 * r * \sin(\text{theta}_4) + F_5 * r * \sin(\text{theta}_5) + F_6 * r * \sin(\text{theta}_6) = 0$$

Simultaneously, the control system adjusts both the engine power and average pitch of the blades up to generate more lift or down to generate less lift. The control system can alternatively control just engine power or average blade pitch, though it is preferred to control both for faster response. The control system can also add lift at selected locations around the rotors to cause the aircraft to go forward, backwards, left, and right. In the preferred embodiment, for each blade the computer 54 outputs a signal to a motor amplifier 52, which draws current from batteries 56. Motor amplifier 52 selectively supplies power to motor 32, which drives transmission 34, which in turn rotates blade 1a about an axis parallel to the blade's length, changing the blades angle of attack. The angle of attack is fed back to the control system by angular position sensor 42, which transmits a signal to computer 54. Angular position sensor 43 keeps track of the absolute position of a rotor relative to the airframe; since the blades are fixed in angular position relative to each other, knowing the position of a rotor gives the position of the blades attached to it. Because both rotors 4 and 5 have these angular position sensors 43, it is possible for the control system to determine the angular difference between the rotors. By computing the change in position per unit of time of each rotor, the control system also knows the speed at which each of the rotors 4 and 5 are turning.

Figure 16:
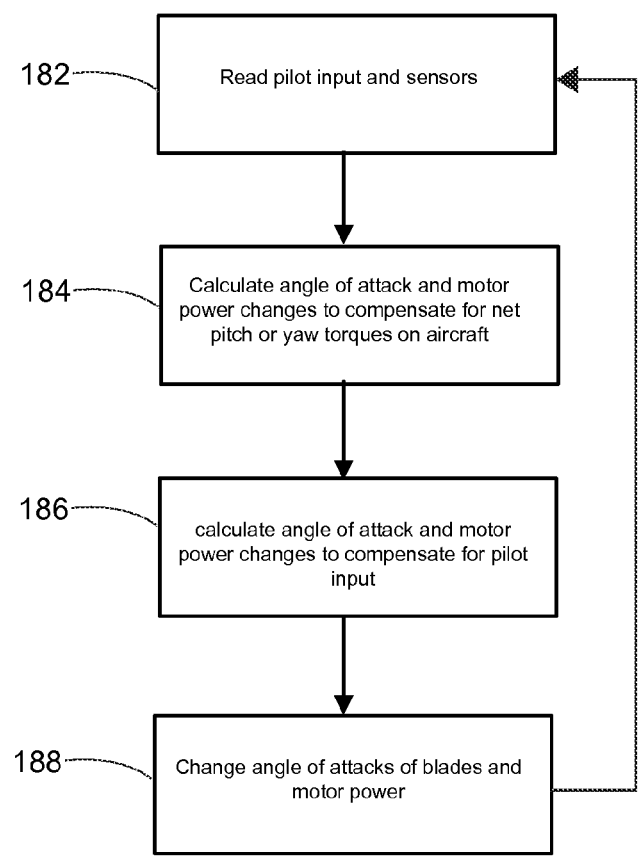
FIG. 16 is a simplified flow chart of an aspect of the present embodiments.
Figure 17:
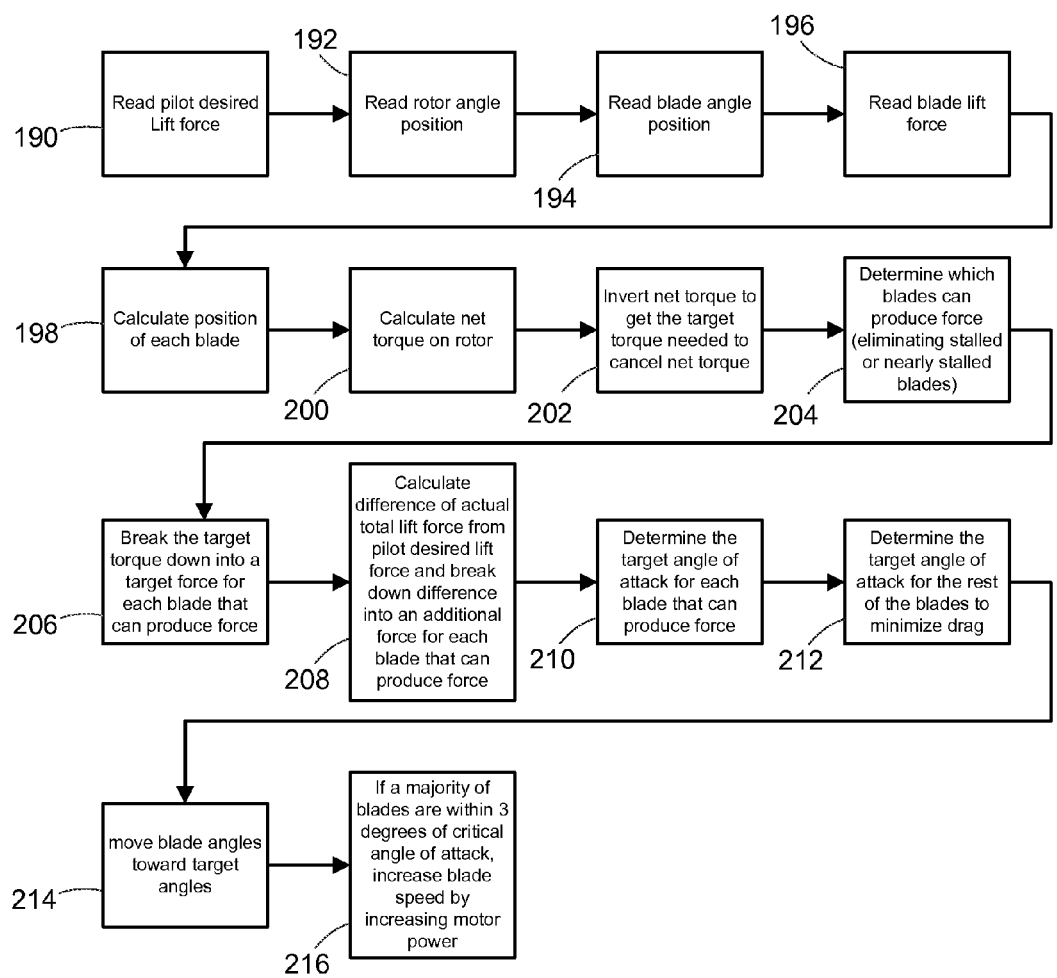
FIG. 17 is a detailed flow chart of an aspect of the present embodiments.

FIG. 16 shows how the computer controls the craft. In step 182, the computer gets data from the rotor position sensors 43 on each rotor 4 and 5, the blade angle of attacks from each blade's angular position sensor 42 and force sensor 48. Next, in step 184, the computer calculates what angle of attack and motor power changes are required to compensate for wind, forward velocity, sideways velocity, and other effects that would change the effective airspeed of the air across the blades. Next, in step 186, the computer calculates what angle of attack and motor power changes are required to compensate for what the pilot is trying to make the craft do—move up, down, sideways, forward, backwards, and so on. For example, motor power and the angle of attack of blades would be increased to ascend. Next, in step 188, for each blade, the computer sends a signal to motor amplifier 52 to cause motor 32 to change the angle of attack of the blade toward the new angle of attack. The computer also adjusts power to motorized props 3a and 3b for each rotor to add or reduce power based on the calculations. This cycle repeats continually every second, with the computer continually reading pilot and sensor input, calculating the required angle of attack and power changes, and adjusting the angle of attack and power toward the new values. FIG. 17 presents a more detailed breakdown of the cycle. In step 190, the signals sent by the controls the pilot is using are received by the computer. In step 192, the computer reads the rotor angle position sensors 43 on each rotor and also airframe angle position sensor. In Step 194, the angular position sensors 42 are used to determine the angle of attack of each blade. In Step 196, the blade lift force is measured by using force sensor 48 on each blade. In Step 198, the computer uses the readings from the rotor angle position sensors 43 on each rotor and also airframe angle position sensor 88 and determines the orientation of rotors 4 and 5 to each other. It also uses the reading from airframe angle position sensor 88 to determine what a "forward" command is, for example, relative to the twin rotors. In step 200, the following sums (as explained earlier) are calculated:

$$\mathrm{Sum}X = F_1 * r * \cos(\text{theta}_1) + F_2 * r * \cos(\text{theta}_2) + F_3 * r * \cos(\text{theta}_3) + F_4 * r * \cos(\text{theta}_4) + F_5 * r * \cos(\text{theta}_5) + F_6 * r * \cos(\text{theta}_6)$$

$$\mathrm{Sum}Y = F_1 * r * \sin(\text{theta}_1) + F_2 * r * \sin(\text{theta}_2) + F_3 * r * \sin(\text{theta}_3) + F_4 * r * \sin(\text{theta}_4) + F_5 * r * \sin(\text{theta}_5) + F_6 * r * \sin(\text{theta}_6)$$

These sums give a net torque vector for all of the pitch and roll torques. In step 202, the sums are each multiplied by −1 to arrive at the counter torque vector required to cancel the net torque vector. In step 204, the computer determines which blades can produce force because they are not stalled or near a stall. For example, a wind gust may reduce the effective airspeed on a blade enough that it produces significantly less lift. In a case such as this, the other nearby blades on the same rotor or the other rotor must compensate for the lost lift. In step 206, the required counter torque vector is decomposed into individual forces for the blades that can produce lift, using the known locations of the blades. In step 208, the difference between the actual lift and the pilot's desired lift force is calculated and decomposed into individual forces for the blades that can produce lift. In step 210, the target angle for each blade is computed based on the desired lift force the blade. In step 212, the target angle that the blades that are stalled or nearly stalled should be adjusted to in order to minimize drag is calculated. In step 214, all the blades are adjusted to their new angles of attack by driving motor amplifier 52 with the appropriate signal, which in turn drives motor 32 to rotate each blade, for example blade 1a. In step 216, if a majority of blades are within 3 degrees of the critical angle of attack (that angle of attack just before stall at which maximum lift is typically produced) then the power to motorized propellers 3a and 3b and the corresponding motorized propellers on rotor 5 is increased to increase the speed of the rotors. By increasing the speed of the rotors, a lower angle of attack is required to achieve the same lift, so that in the next cycle the angle of attack of the blades will typically be reduced to maintain the commanded lift force. The above described loop is preferably repeated at 500 Hz or more, such that the adjustments during a given loop are small.

Figure 13:
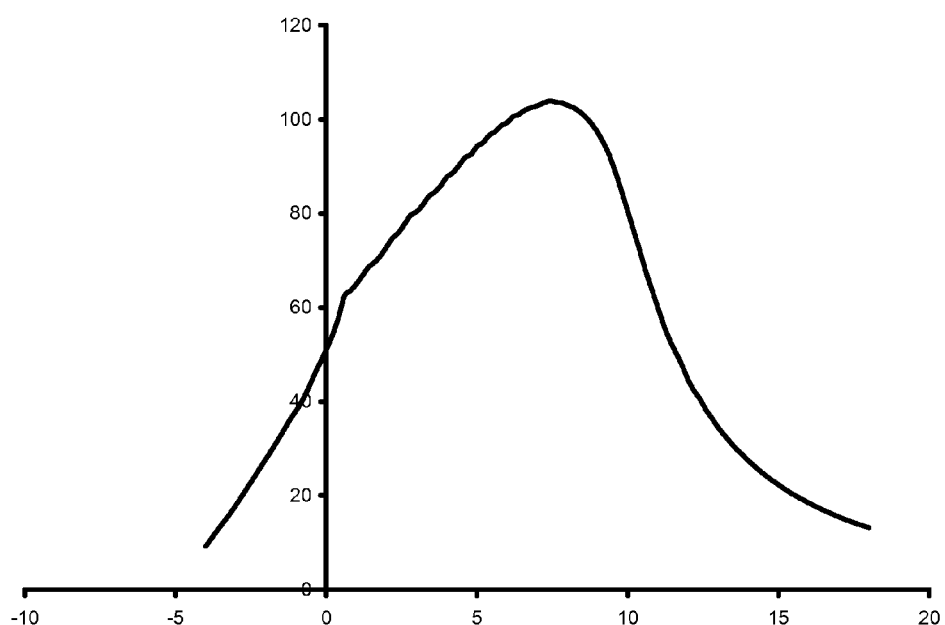
FIG. 13 is a graph of an aspect of the present embodiments.
Figure 14:
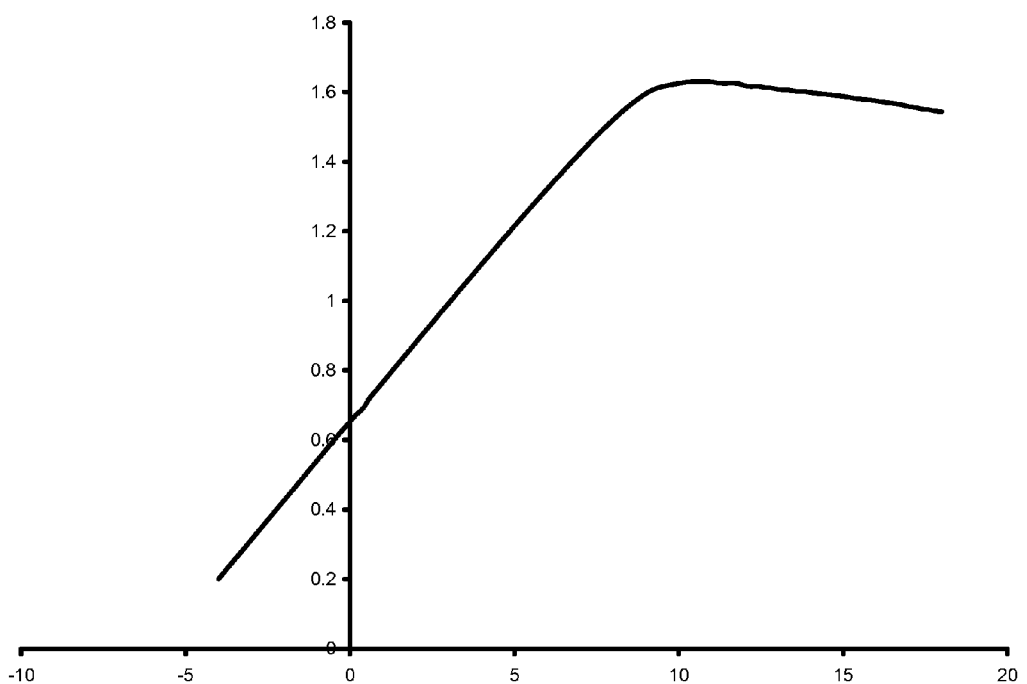
FIG. 14 is a graph of an aspect of the present embodiments.
Figure 15:
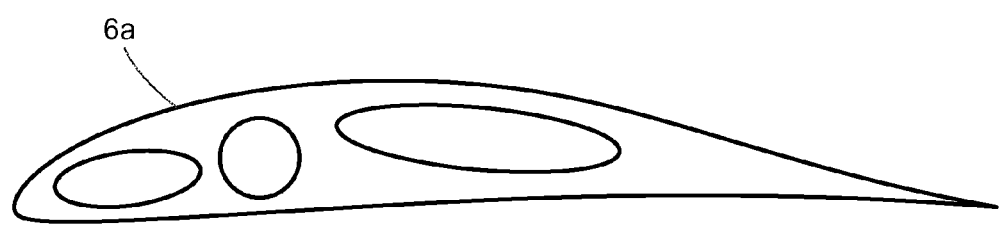
FIG. 15 is a simplified partial elevation view of an alternative embodiment.

FIG. 15 shows the airfoil shape of rib 6a. The airfoil used is known as the DAE-11 profile which was created by Mark Drela of MIT. FIG. 13 shows a graph of the coefficient of lift (CL) divided by the coefficient of drag (CD) of DAE-11 at a Reynolds number of 288,000 as a function of angle (x axis, degrees). FIG. 14 shows a graph of the coefficient of lift (CL) of DAE-11 at a Reynolds number of 288,000 as a function of angle (x axis, degrees). The vertical line marked in FIG. 13 shows the beginning of the plateau where a blade achieves an optimal lift/drag ratio. The control system tries to maintain the blades of rotors 4 and 5 on the plateau when possible, meaning that the control system tries to set the angle of attack of the blades to around 6-9 degrees at a rotor speed corresponding to a Reynolds number of 288,000. The control system also limits the angle of attack at the same Reynolds number to less than 10 degrees, as there is no point in increasing the angle further because no additional lift is generated and only additional drag results. The control system also accounts for the effective Reynolds number, such that these angular control values change according to changes in effective airspeed.

At this point it must be made clear why there are two seemingly redundant, torque-less counter-rotating rotors.

First, dual counter-rotating and coaxial rotors are used to ensure that stalls encountered while rotating the rotor at extremely low RPM can be potentially compensated for. We say potentially because having dual coaxial rotors is not enough to compensate for a stall, particularly when RPMs are very low. For example, consider two two-bladed rotors spinning in opposite directions at extremely low RPMs—low enough to result in a tip speed of 30 mph instead of the typical 450 mph tip speed. We generally cannot rely on gyroscopic effects to stabilize such rotors in a plane because the rotor RPMs are typically too low. Now consider what happens when a 30 mph gust of wind hits the rotor from one side parallel to a blade of a rotor. When this happens, one blade of the rotor will stall and the other blade will produce substantially increased lift, resulting in a torque that will try to roll the rotor toward the stalled blade. If there are two coaxial rotors and the rotors are at 90 degrees relative to each other, the other rotor is incapable of resisting the roll because it is effectively aligned with the axis of rotation, and therefore any forces on that rotor have a moment arm of 0 length (and therefore create 0 torque) to oppose the roll.

Figure 4:
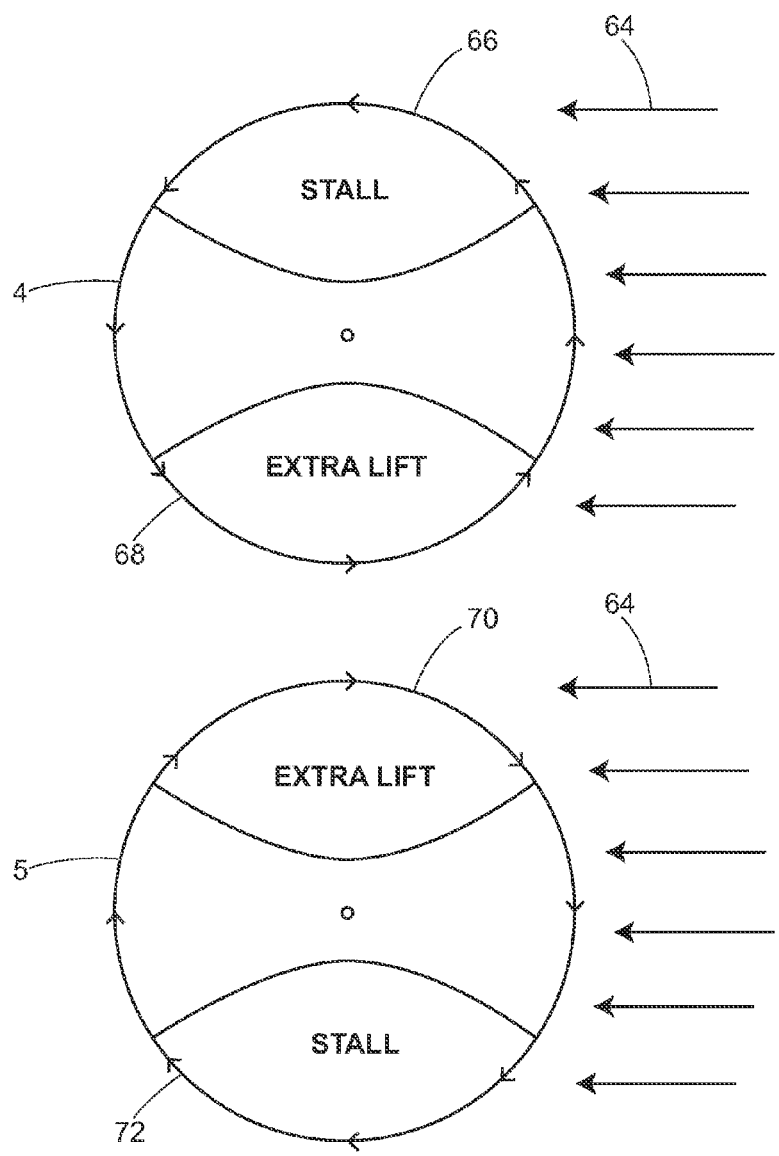
FIG. 4 is a simplified diagram illustrating relative airflow in the embodiment shown in FIG. 1.

However, we can also now imagine that if the blades of the two rotors are fairly aligned, then the other rotor can potentially oppose the roll, because it would be advancing instead of retreating (since it is turning the opposite direction of the stalling blade of the other rotor). FIG. 4 clarifies this situation. Rotor 4 is turning counterclockwise (as indicated by the arrow heads) while rotor 5 is turning clockwise. The two rotors 4 and 5 are coaxial, but in FIG. 4 they are separated for clarity. Wind 64, a 30 mph wind blowing from right to left, will clearly stall the top portion of rotor 4 because rotor 4's tip speed (and therefore its maximum speed) is only 30 mph, and the wind is blowing in the same direction that rotor 4 is moving at its top portion, thereby effectively giving the airfoil of rotor 4 at that sector an airspeed at the tip of around 0 mph. Likewise, the airfoil of rotor 5 has an effective airspeed at the tip of around 60 mph (30 mph due to rotation+30 mph relative to the wind) at the same sector. Note that because the lift produced by an airfoil varies as the square of the airspeed, the lift produced by rotor 4 at that sector will in fact overcompensate for the lost lift if the power is available. For example, if a sector of rotor 4 produced 900 units ($30^2$) of lift and a sector of rotor 5 also produced 900 units of lift initially, for a total of 1800 units of lift, we would expect the sector of rotor 4 to produce 0 units of lift and the sector of rotor 5 to produce $(2*900^{(1/2)})^2 = 3600$ units of lift (provided enough additional power was supplied to the rotor), more than enough to compensate for the complete loss of lift of the stalled rotor blade.

The above example assumed that the blades of rotors 4 and 5 were fairly aligned. As the previous two-bladed example showed, if the blades are aligned at 90 degrees, it is generally not possible for the rotor 5 to compensate for rotor 4 at extremely low RPMs, which would result in at least a wobbling of the rotor shaft and airframe at a frequency of twice the rate of rotation. Therefore, besides the coaxial configuration, the present embodiments use more than 2 blades on each of the rotors, for example 6 blades per rotor, to prevent times in the rotation when one rotor cannot compensate for the other. If rotors 4 and 5 are mounted sufficiently close to each other along rotor shaft 8, then any gust of wind that would decrease the effective velocity of a blade on one rotor would simultaneously increase the effective velocity of the corresponding blade on the other rotor by nearly the same amount. The maximum difference in the velocity change between the two rotors decreases as the number of blades increases. For example, having 6 blades per rotor means that there is always an advancing blade on the second rotor within 30 degrees (360/6 *1/2) or less of a retreating blade of the first rotor.

Figure 11:
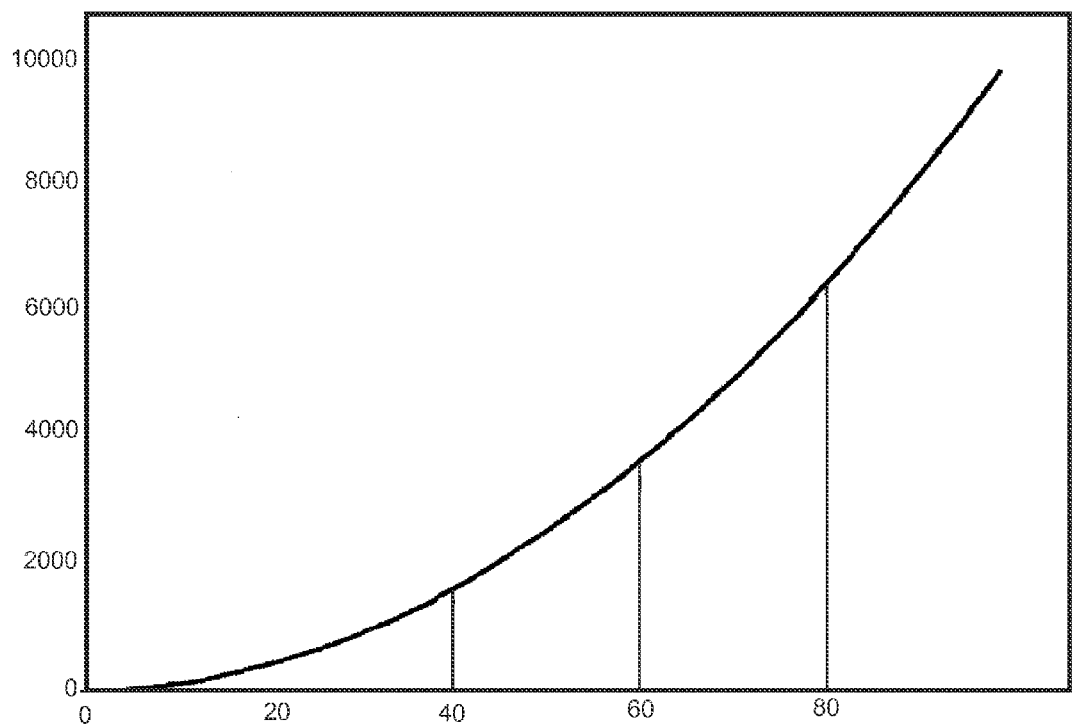
FIG. 11 is a graph of an aspect of the present embodiments.

Consider the graph shown in FIG. 11 where the X axis represents effective airspeed in mph and the Y axis represents the square of the mph, representative of the lift of an airfoil as its effective airspeed is increased (because lift varies as the square of effective airspeed). We can see that if the airfoil of a rotor blade is normally moving at 60 mph, and a 20 mph gust of wind hits it from the rear, we can expect its effective airspeed to drop to 40 mph, resulting in a relative lift force loss of $60^2-40^2=2000$ units. However, the counter-rotating blade coaxial to it would ideally (if parallel to the other blade) encounter an effective airspeed of 80 mph, resulting in a relative lift force increase of $80^2-60^2=2800$ units due to the same gust. That would be the ideal case, but what if the blades are not parallel? If the gust is directly perpendicular to the first blade, and both rotors had 6 blades, then we could expect a worst case position of the corresponding blade on the other rotor to be 30 degrees off from the perpendicular of the wind, resulting in an effective airspeed reduction by a factor of the cosine of 30 deg or 87% of the airspeed of the first blade or 20*0.87=17.4 mph. Therefore, the lift force in this case would increase by $77.4^2-60^2=2391$ units, still more than the lost lift of the retreating blade. There are other factors to take into consideration, such as the slight reduction in effective diameter of the rotor at an angle, the effects of interference between the two rotors, and so on, but we can see that the lift gained is comparable to the lift lost so long as the gust impacts both of the opposing rotor blades. This is a reasonable expectation if the blades are sufficiently close. Normal coaxial helicopter design suggests that a rotor spacing of 10% of their diameters is a good choice to optimize the efficiency of the rotors, but moving the rotors closer than 10%, or even closer than 5%, of the rotor diameters may be necessary.

The above example explains the reason for the present embodiments using two rotors, but so far we did not explain why the rotors are preferably torque-less, meaning that they do not exert a significant torque on airframe 9. With two counter-rotating rotors, it seems plausible to cancel the reaction torque caused by driving one rotor with the reaction torque caused by driving the other rotor. The reason to preferably make each torque-less is because in the present embodiments, running the rotors at extremely low RPMs will frequently produce large shifts in the lift (and drag) produced by each blade of each rotor as the angle of attack of each blade is adjusted to account for gusts of wind, directional velocity, and so on. The continual shifts in drag for each rotor will cause the torque required to rotate each rotor to vary continually, and generally the torques of each rotor will be different from the other. While it would be possible to compensate for this variation, it adds a good deal of complexity and inherent instability to the design, and so it is not preferred. By eliminating any significant torque from the rotors through driving them with propellers at their tips, computer 54 is only concerned (typically, such as when hovering) with preventing the aircraft from pitching or rolling. Additionally, the high tip speeds required of conventional rotors generally make it difficult to use propellers to drive the rotors to create a torque-less design; the extremely low RPMs of the present embodiments, however, make the use of propellers more practical, because the tip speeds are lower and within the airspeed regime of standard propellers. It is preferred to drive a rotor by using two propellers blowing in opposite directions and at an equal distance from the rotational axis of the rotor.

Figure 5:
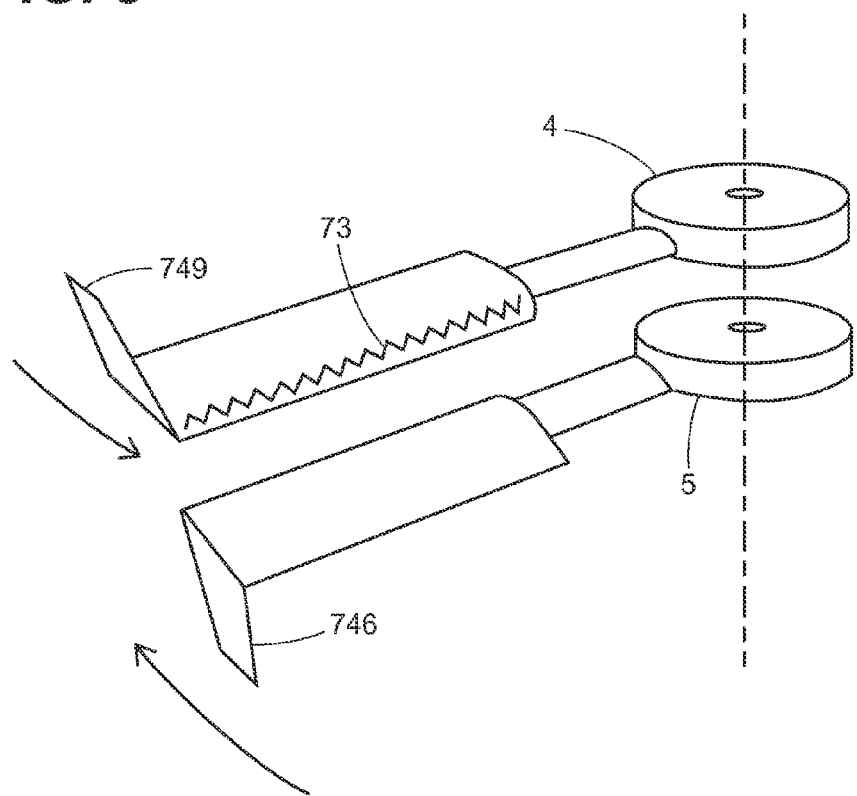
FIG. 5 is a simplified partial isometric view of an alternative embodiment.

It is preferable to place the rotors close together to ensure that the air conditions encountered by one rotor match those encountered by the other (opposite turning) rotor, so that for example a stall on one rotor can be compensated for using the other rotor. In FIG. 5, for example, shows only one blade from each of rotors 4 and 5, but they are exceedingly close to each other along the axis of rotation.

To prevent all blades of both rotors from coinciding at once, it may be desirable to use differing numbers of equally spaced blades on each rotor. For example, one rotor may have 6 blades while the other rotor has 7 blades. This ensures that only 1 blade pair are overlapping at a time. This is desirable because, for example, the high pressure generated underneath the topmost blade would push into the low pressure above the lower blade, thereby reducing the lift from both blades during the period of overlap. In such situations, it may also be desirable to set the angle of attack of the overlapping blade pair to the minimum drag configuration (typically 0 angle of attack) since there is no point in incurring a drag penalty without producing lift. It may also serve to reduce the noise generated as the blades overlap.

Unlike the rotors of a conventional design, the extremely low RPMs of the present embodiments result in a much smoother flow across the blades. Also, centrifugal effects on the flow due to rotation are greatly reduced. Therefore, it may be advantageous to add winglets of the kind used on airplanes to reduce the movement of air from the high pressure region below the blade to the low pressure region above the blade. This may reduce the induced drag on the blades and improve their efficiency. When the rotors are close to each other, it may be desirable to arrange the winglets 74a and 74b of the upper and lower rotors respectively so as to point opposite of each other, as shown in FIG. 5. Alternatively, the winglets can both point up or down, but one rotor's blades could be slightly longer than those on the other rotor to allow the winglets of that blade to pass the winglets of the other rotor using a slightly larger diameter.

In the preferred embodiment, the chord of the blades is preferably on the order of 3 ft., with a diameter of 24 ft. or more. Because there are 2 rotors and each rotor has 6 blades each, the area of the blades is large and the Reynolds number is approximately 300,000. In fact, it is generally preferable in the present embodiments to run the blade airfoils at a Reynolds number of less than 1 million, and more preferably below 600,000. Because of the low Reynolds numbers, laminar flow occurs at the front of the airfoils, but there is a danger of a separation bubble forming further along the airfoil that would decrease airfoil performance significantly. To combat this effect, it may be desirable to place a turbulator strip 73 near the leading edge of a blade to induce the transition to turbulent flow early and avoid such bubbles. In some instances multiple rows along the entire length of the airfoil may be called for to improve performance.

It may be advantageous to place opposing blade pairs at slightly different coning angles on a multi-bladed rotor of an even number of blades, to minimize the overlapping of the blade paths during rotation. The coning angle for purposes of this description is the angle made by the blades with a plane perpendicular to the axis of rotor rotation. For example, on a 6 bladed rotor, 2 opposing blades may have a coning angle of 0 degrees, 2 blades have a coning angle of 3 degrees, and 2 blades have a coning angle of −3 degrees.

Figure 6:
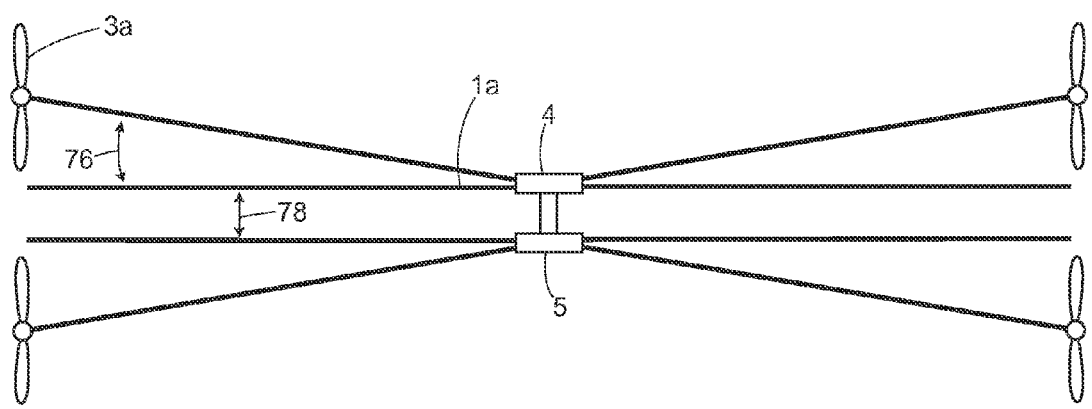
FIG. 6 is a simplified partial elevation view of an alternative embodiment.

It may be advantageous to tilt the carbon fiber poles of motorized propellers 3a and 3b of rotor 4 upwards X degrees (as shown by angle 76 on FIG. 6) while tilting the carbon fiber poles of the corresponding motorized propellers in rotor 5 downwards X degrees, where X is the degrees sufficient to place the lower tips of propellers 3a and 3b above the plane of the rotor blades of rotor 4. This would allow rotors 4 and 5 to be placed much closer together, making distance 78 as shown on FIG. 6 relatively short compared to the configuration shown in FIG. 1.

Figure 7:
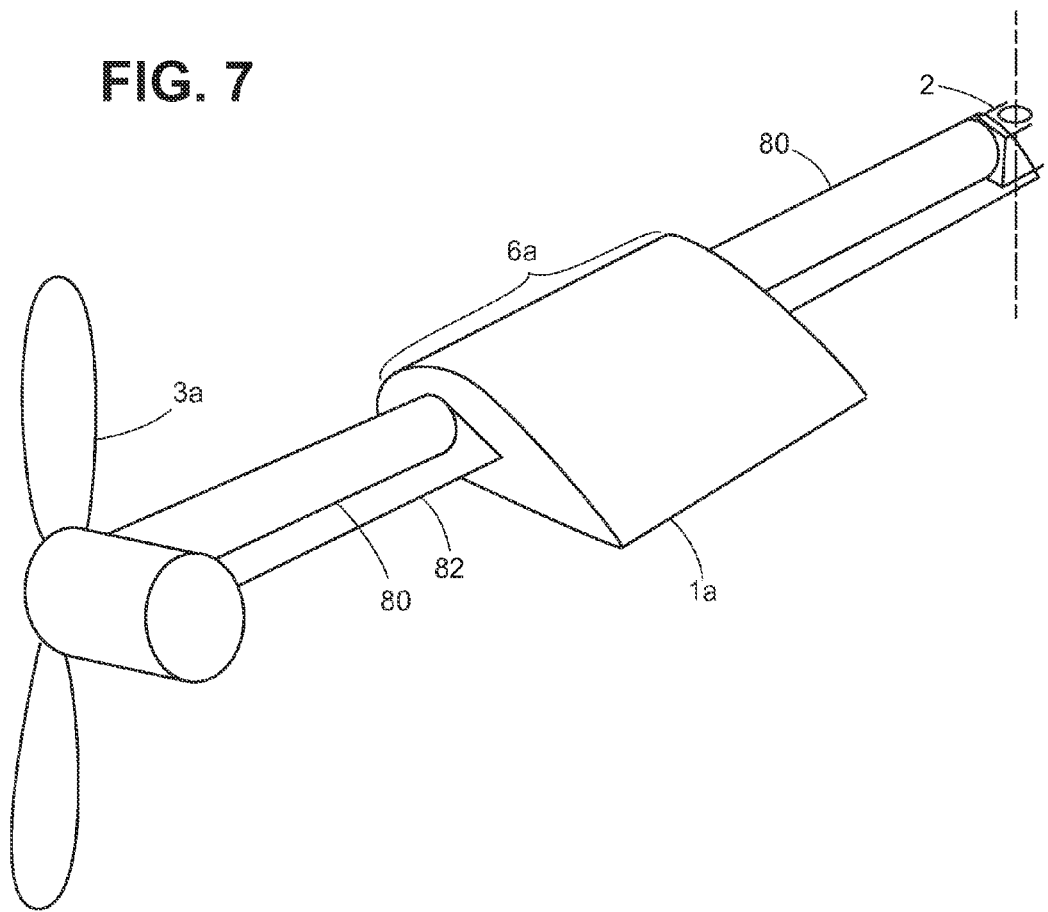
FIG. 7 is a simplified partial isometric view of an alternative embodiment.

To reduce drag, the spar supporting the motorized propellers may be placed concentric with the spar of a blade, such that rotation of the blade due to angle of attack changes does not cause the motorized propellers to rotate. This is shown in FIG. 7, where blade 1a can rotate about the axis of carbon fiber tube 80, which supports motorized propeller 3a. The rotation of blade 1a does not cause tube 80 to rotate, as tube 80 passes through blade 1a and is fixed to hub 2. Tube 80 is covered by low drag airfoil shape 82, to minimize aerodynamic drag.

It may be desirable to twist the blades so that the lift is fairly constant along their length, as is commonly done on helicopters. It may also be desirable to taper the blades.

Figure 8:
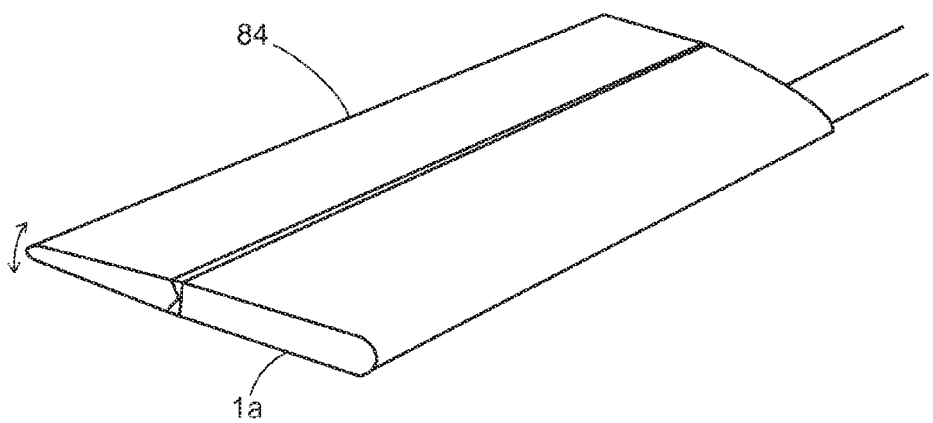
FIG. 8 is a simplified partial isometric view of an alternative embodiment.

The effective angle of attack can also be changed by aileron-like surface 84 on the blade 1a that deflects the airflow, as shown in FIG. 8. This would eliminate the need to rotate blade 1a to change its angle of attack. By tilting aileron-like surface 84 down, lift is generated.

To control yaw on the preferred embodiment, vanes are used to slightly redirect the flow of air on each side of the aircraft, allowing the aircraft to yaw as a result of the opposite horizontal components of the flow of air on each side of the aircraft. As shown in FIG. 1, vanes 86a and 86b are mounted to opposite sides of airframe 9. Rotating vanes 86a and 86b in opposite directions allows air blowing down from rotors 4 and 5 to be directed in forward and reverse directions, causing rotation of airframe 9 about the axis of rotor shaft 8. Alternatively, airframe 9 can simply be rotated by a motor 88 which causes airframe 9 to rotate about the axis of rotor shaft 8. An angular position sensor detects the difference in angle between airframe 9 and rotor shaft 8 to allow the control system to account for the change when, for example, the rotor is commanded to change pitch to move the craft in the forward direction.

To control pitch and roll, either vanes can be used to slightly redirect the flow of air from the rotors (i.e., vanes 86a and 86b could be tilted in the same direction), or the pitch of the rotors can be adjusted as in conventional helicopters to, for example, provide more thrust at the rear section of the rotor to go forward.

Figure 9:
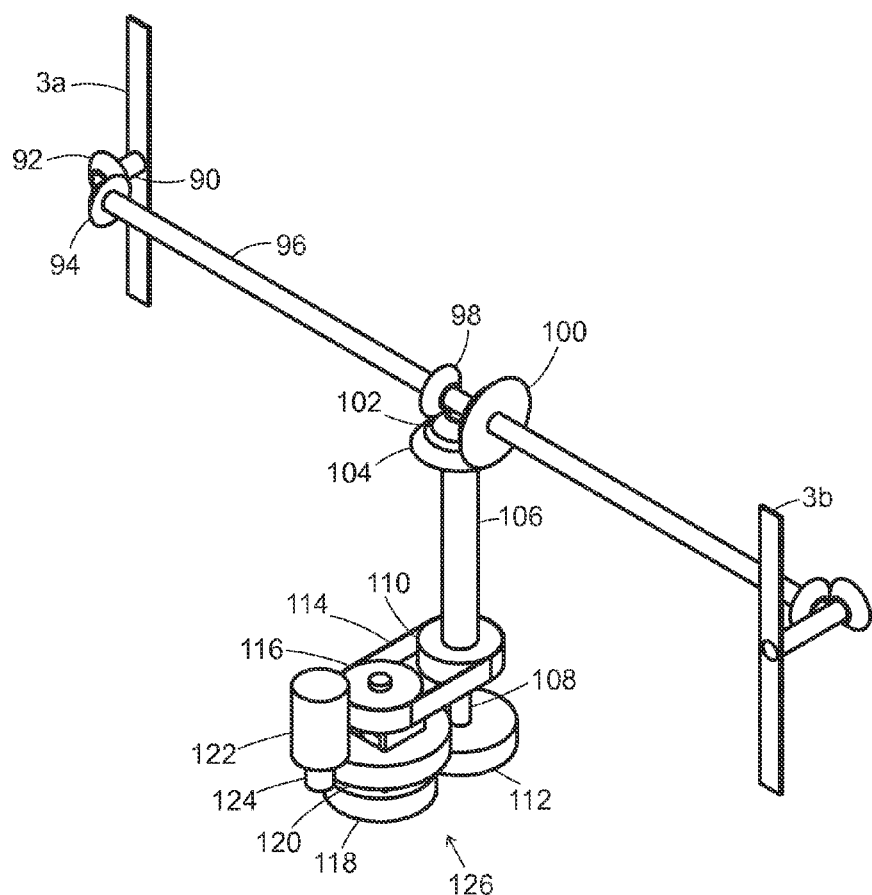
FIG. 9 is a simplified partial isometric view of an alternative embodiment.
Figure 10:
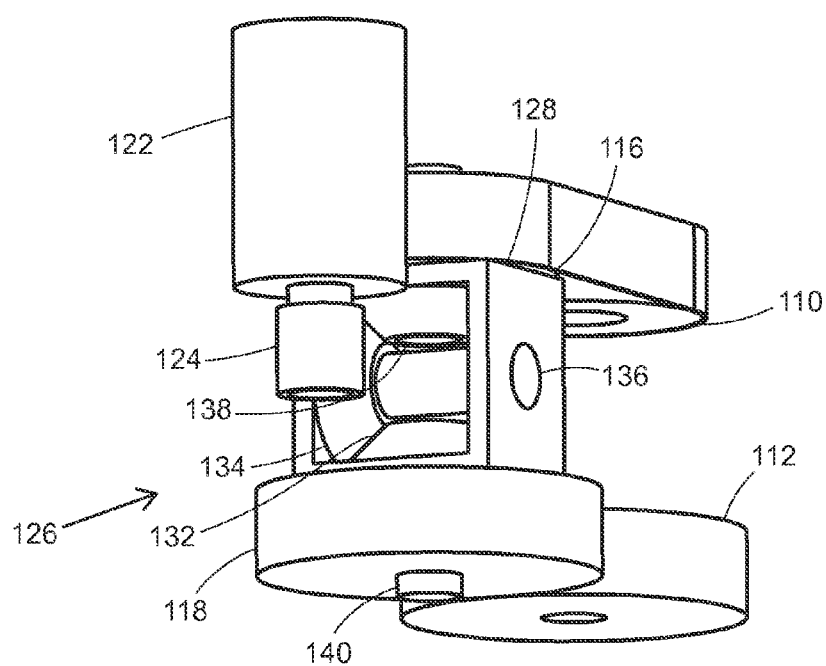
FIG. 10 is a simplified partial isometric view of components of the embodiment shown in FIG. 9.

FIG. 9 shows an alternative means of driving propellers 3a and 3b on a single or dual rotor helicopter. In the case of a dual rotor helicopter, two such arrangements would be necessary, as FIG. 9 shows the mechanisms required for just one rotor. Motorized propeller 3a is directly affixed to a propeller shaft 90, which is directly affixed to a bevel gear 92, which itself intermeshes with a bevel gear 94 (these items are repeated on the opposite end of a blade shaft 96 to drive motorized propeller 3b, with only the length of the shaft corresponding to propeller shaft 90 being different). Bevel gear 94 is directly affixed to blade shaft 96, which is affixed to bevel gears 98 and 100. A bevel gear 102 intermeshes with bevel gear 98 and turns an inner shaft 108, which is affixed to a spur gear 112, which intermeshes with a spur gear 118. Bevel gear 100 intermeshes with a bevel gear 104, which is affixed to an outer tube 106, which in turn is affixed to a timing pulley 110. Timing pulley 110 intermeshes with a timing belt 114, which also intermeshes with a timing pulley 116. Thus, when timing pulley 116 turns clockwise, timing pulley 110 likewise turns clockwise, as does outer tube 106, and correspondingly bevel gear 104, causing bevel gear 100 and therefore blade shaft 96 clockwise. Rotating spur gear 118 clockwise causes spur gear 112 to rotate counterclockwise, causing shaft 108 and correspondingly bevel gear 102 to turn counterclockwise, causing bevel gear 98 and correspondingly blade shaft 96 to turn clockwise. Between timing pulley 116 and spur gear 118 is a differential 126. As seen in FIG. 10, differential 126 is comprised of a frame 128, with bevel gears 130, 132, and 134 intermeshed within frame 128. Bevel gear 130 is affixed to a shaft 138 which itself is affixed to timing pulley 116. Bevel gear 132 is affixed to shaft 140 which is itself affixed to spur gear 118. Shafts 136, 138, and 140 are rotably coupled to frame 128. As shown in FIG. 9, frame 128 is surrounded by and rotated by a spur gear 120, which rotates about the axis of shafts 138 and 140. An electric motor 122 drives a pinion gear 124, which in turn drives spur gear 120. Components 116, 114, 110, 106, and 104 together have the same rotational inertia when timing pulley 116 is rotated as components 118, 112, 108, and 102 do when spur gear 118 is rotated. Differential 126 causes timing pulley 116 and spur gear 118 to have substantially equal torques when spur gear 120 is driven by motor 122 through pinion 124. Therefore, motorized propellers 3a and 3b can be powered by electric motor 122, which is in airframe 9, without a substantial net torque being applied to airframe 9, as a result of the application of substantially equal forces in opposite directions at the intermeshing of bevel gear pairs 104, 100 and 102, 98.

In an alternative embodiment, a generator 58 is driven by a gas turbine or internal combustion engine 60 to charge batteries 56 as shown in FIG. 3.

While features of the embodiments have been illustrated and described, many modifications, substitutions, changes, and equivalents will occur to those skilled in the art. It is to be understood that the appended claims are intended to cover all such modifications, substitutions, changes, and equivalents that fall within the true spirit of the embodiments.

What is claimed:

1. A rotor system comprising:
   a) A first hub for rotation about a first axis;
   b) a plurality of blade assemblies attached to said first hub, each of said blade assemblies comprising 1) a rotor blade; 2) an actuator for rotating the rotor blade; 3) a position sensor for measuring an angle of attack of the rotor blade; and 4) a sensor for measuring a lift force acting on the rotor blade; and
   c) a computer for collecting data of the angle of attack and the lift force and outputting a signal to the actuator based on the data.

2. The rotor system of claim 1, further comprising a second plurality of blade assemblies attached to a second hub for rotation about a second axis approximately coincident with the first axis.

3. The rotor system of claim 2, wherein said first and second hubs are connected via an electric motor.

4. The rotor system of claim 2, wherein the sensing is performed by at least one force sensor measuring a lift force on a second rotor blade on the first rotor.

5. The rotor system of claim 2, wherein the first rotor is rotating with a tip speed of less than 100 mph.

6. The rotor system of claim 2, wherein no substantial net torque is applied to the airframe by the first and second rotors.

7. The rotor system of claim 2, wherein the first rotor is rotated by blown air.

8. The rotor system of claim 7, wherein the blown air is generated by a propeller attached to the first rotor.

9. The rotor system of claim 8, wherein the propeller is driven by an electric motor.

10. The rotor system of claim 2, wherein the first and second rotors each have a plurality of rotor blades and the number of rotor blades of the first rotor differs from the number of rotor blades of the second rotor.

11. The method rotor system of claim 2, wherein an airfoil of the rotor blade operates with a Reynolds number of less than 1 million as the second rotor is rotated.

12. The rotor system of claim 1, further comprising at least one vane for directing airflow generated by the rotor system.

13. The rotor system of claim 1, further comprising a propeller for driving the first hub and the plurality of blade assemblies about the first axis.

14. A method of controlling a helicopter rotor system comprising the steps of:
   a) providing a first rotor having a first plurality of blades;
   b) providing a second rotor having a second plurality of blades and mounted approximately coaxial to the first rotor;
   c) driving said first and second rotors to turn in opposite directions;
   d) sensing a loss of lift on a first section of the first rotor; and
   e) increasing lift on a second section of the second rotor that overlaps with at least a portion of the first section of the first rotor.

15. The method of claim 14, wherein the first rotor has a tip speed while being driven, wherein the first rotor is driven such that the tip speed of the first rotor is less than 100 mph.

16. The method of claim 15, wherein the first rotor is driven such that the tip speed of the first rotor is less than 40 mph.

17. A method of compensating for a retreating blade stall on a pair of substantially coaxial, counter-rotating rotors having a plurality of blades comprising:
   a) Dividing the area swept by said counter-rotating rotors into a plurality of sectors;
   b) Determining the lift generated by each rotor of said counter-rotating rotors at each sector;
   c) Increasing the effective angle of attack of at least one of said blades on a first rotor of said pair of counter-rotating rotors due to a loss of lift on a second rotor of said pair of counter-rotating rotors.

18. A method of operating a helicopter having an airframe and first and second substantially coaxial rotors, comprising:
   a) rotating the first rotor clockwise;
   b) rotating the second rotor counterclockwise;
   c) sensing a loss of lift on a portion of the first rotor; and
   d) increasing the angle of attack of a rotor blade of the second rotor as it overlaps the portion of the first rotor where the loss of lift was sensed.

19. A directional control system for a helicopter comprising:
   a) an airframe;
   b) a rotor rotably connected to the airframe, the rotor having an approximately vertical axis of rotation, the rotor for generating an approximately vertical airflow, and
   c) a movable vane connected to the airframe, the movable vane having a surface extending in an approximately vertical direction, the movable vane for tilting from the approximately vertical direction so as to redirect the approximately vertical airflow generated by the rotor, wherein the movable vane is positioned on a first side of the airframe, the system further comprising a second movable vane connected to the airframe on a second side of the airframe approximately opposite the first side relative to the axis of rotation, the second movable vane having a second surface extending in an approximately vertical direction, the second movable vane for tilting from the approximately vertical direction so as to redirect the approximately vertical airflow generated by the rotor, whereby tilting the movable vane and the second movable vane in opposite directions redirects the approximately vertical airflow in opposite directions, providing yaw control of the airframe.

20. The system of claim 19, wherein the movable vane is rotable.

21. The system of claim 20, wherein the movable vane is rotable about a first axis and the second movable vane is rotable about a second axis and the first and second axes are parallel and substantially coincident.

22. A helicopter rotor system comprising:
a) A first hub for rotation about a first axis;
b) a first blade assembly attached to said first hub, the first blade assembly comprising 1) a first rotor blade for generating a first lift force; 2) a first actuator for adjusting the first lift force generated by the first rotor blade;
c) a second blade assembly attached to said first hub, the second blade assembly comprising 1) a second rotor blade for generating a second lift force; 2) a second actuator for adjusting the second lift force generated by the second rotor blade;
d) a computer for outputting a first signal to the first actuator to adjust the first lift force and a second signal to the second actuator to adjust the second lift force, and
e) a sensor connected to the first rotor blade for measuring the first lift force generated by the first rotor blade.

23. The helicopter rotor system of claim 22, wherein the first actuator adjusts the first lift force generated by the first rotor blade by tilting the first rotor blade.

24. The helicopter rotor system of claim 22, further comprising:
A second hub for rotation about the first axis;
a third blade assembly attached to said second hub, the third blade assembly comprising 1) a third rotor blade for generating a third lift force; 2) a third actuator for adjusting the third lift force generated by the third rotor blade;
a fourth blade assembly attached to said second hub, the fourth blade assembly comprising 1) a fourth rotor blade for generating a fourth lift force; 2) a fourth actuator for adjusting the fourth lift force generated by the fourth rotor blade,
wherein the computer outputs a third signal to the third actuator to adjust the third lift force and a fourth signal to the fourth actuator to adjust the fourth lift force.

25. The system of claim 22, wherein the sensor is a force sensor.

26. A method comprising the steps of:
a) Providing a first rotor;
b) Providing a second rotor coaxial to the first rotor;
c) Providing an airframe, the airframe connected to the first rotor and to the second rotor;
d) Rotating the first rotor in a first direction;
e) Rotating the second rotor in a second direction, the second direction being opposite the first direction;
f) Sensing a decrease in lift force on a first portion of the first rotor; and
g) Increasing lift force on a second portion of the second rotor to compensate for the decrease in lift force on the first portion of the first rotor.

* * * * *